United States Patent [19]

Blucher et al.

[11] Patent Number: 4,642,012
[45] Date of Patent: Feb. 10, 1987

[54] FASTENING ASSEMBLY FOR ROOFS OF SOFT MATERIAL

[75] Inventors: William J. Blucher, Addison; Richard J. Ernst, Palatine; Francis C. Peterson, St. Charles, all of Ill.

[73] Assignee: Illinois Tool Works Inc., Chicago, Ill.

[21] Appl. No.: 609,160

[22] Filed: May 11, 1984

[51] Int. Cl.⁴ ............................................. F16B 35/04
[52] U.S. Cl. ..................................... 411/371; 411/395; 411/411; 411/533
[58] Field of Search ............... 411/371, 372, 378, 383, 411/395, 396, 532, 411, 177, 178, 179, 180, 182, 39, 531, 533

[56] References Cited

U.S. PATENT DOCUMENTS

| | | | |
|---|---|---|---|
| 126,366 | 4/1872 | Wills | 411/395 X |
| 770,022 | 9/1904 | Newhall | 411/39 |
| 1,138,219 | 5/1915 | Hottenroth | 411/57 |
| 1,396,611 | 11/1921 | White | 411/178 |
| 1,825,419 | 9/1931 | Plym | 411/411 |
| 2,377,397 | 6/1945 | Booth | 411/403 |
| 3,596,656 | 8/1971 | Kaute | 411/531 X |
| 4,361,997 | 12/1982 | DeCaro | 411/533 X |
| 4,543,763 | 10/1985 | Ernst | 411/531 X |

Primary Examiner—Gary L. Smith
Assistant Examiner—Adrian H. Whitcomb, Jr.
Attorney, Agent, or Firm—David I. Roche; Thomas W. Buckman

[57] ABSTRACT

A fastening assembly for use in attaching articles to soft materials such as gypsum based and light weight concrete roofing. The assembly includes an anchoring element which has a high thread and an axial bore in one end. The thread has an included angle of less than 45° and terminates in a sharp edge at the free end of the anchoring element. A headed screw is driven into the bore and becomes fixed to the anchoring element. A flange is integrally molded and frangibly connected to the bored end of the anchoring element, and becomes a washer upon breaking away therefrom.

3 Claims, 3 Drawing Figures

FASTENING ASSEMBLY FOR ROOFS OF SOFT MATERIAL

BACKGROUND AND SUMMARY OF THE INVENTION

This invention relates to threaded fastening assemblies, and more particularly to such assemblies which are adapted to attach articles to soft material, such as gypsum based roofing material or light weight concrete. Applications contemplated by the present invention include the attachment of rigid insulation to previously existing roof structures. Prior art methods of attaching such insulation have included the use of toggle bolts with pre-drilled holes. The use of toggle bolts, however, presents a problem in roofing repair in that the formation of a hole through the roofing material causes residue to be deposited on the inside of the structure. The falling residue from the drilling operation can interfere with operations carried on within the structure. Another disadvantage of the toggle bolt method is that toggle bolts are generally quite expensive fasteners because they are comprised of a plurality of moving parts.

An object of the present invention is to simplify the attachment of roofing insulation to existing structures.

Another object of the invention is to provide a simplified fastener for attaching articles to soft material.

Another object of the present invention is to provide an inexpensive method of assembling a plurality of threaded elements together with a washer.

These and other objects of the invention are achieved with a fastening assembly which includes an elongated screw having a shank with a head at one end and threads at the other end. An enlarged anchoring element is affixed to the threaded end of the fastener. The anchoring element is a generally cylindrical body having an axial bore in one end and a screw thread disposed on its exterior. The screw thread on the anchoring element has a crest diameter generally twice as large as its root diameter. The anchoring element is preferably a molded part to facilitate the formation of a very high thread. The fastening assembly further includes a washer element captivated between the screw and the anchoring element. The washer has an outer diameter greater than the crest diameter of the anchoring element, and an inner diameter generally less than the head of the screw. The fastening assembly may further be used with a second washer having a large lateral extent to facilitate the attachment of relatively weak insulation material.

DETAILED DESCRIPTION OF THE INVENTION

Figure 1:
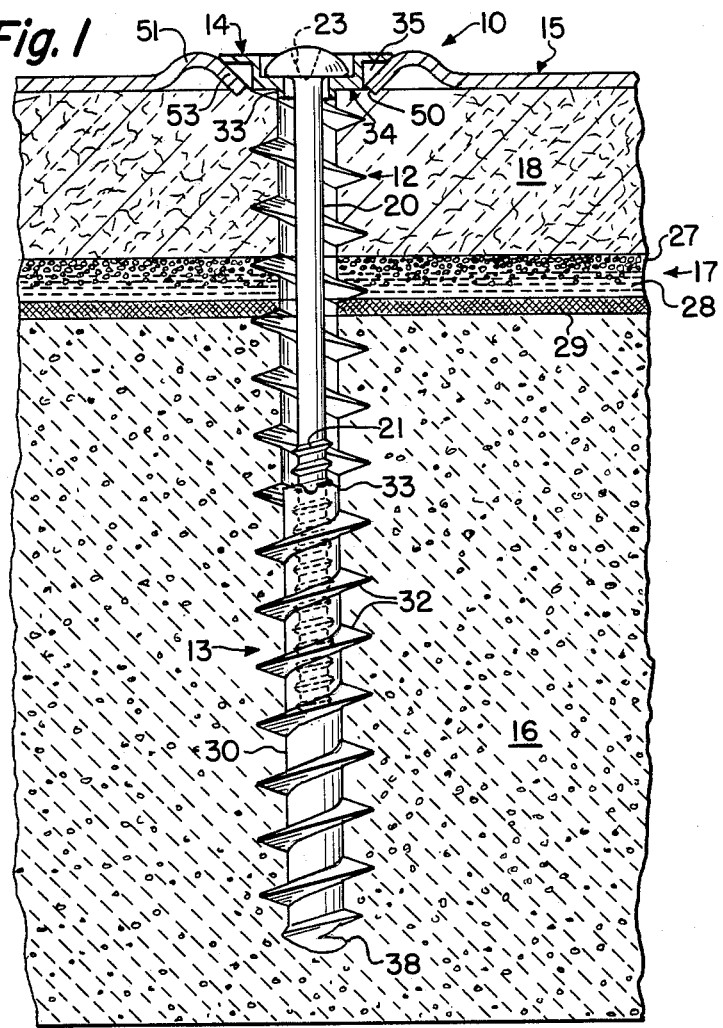
FIG. 1 is an elevational view in partial section showing a fastening assembly of the present invention in an installed position.

Referring now to the drawings wherein like parts are designated by the same numerals throughout the various figures, FIG. 1 shows the fastening assembly generally at 10 installed through rigid insulation 18, built up roofing layer 17 and into base material 16. The layer 17 is comprised of gravel 27, tar 28 and felt 29. The assembly includes an elongated screw 12 having a shank 20 with threads 21 at one end and head 22 at the other end with a Phillips drive 23. Attached to the threaded end of the screw is an anchoring element 13. The anchoring element 13 is comprised of a generally cylindrical body 30 having a thread 32 disposed on its exterior. An axial bore 31 is formed in one end of the anchoring element 13. The thread 32 terminates in a sharp cutting edge 38 which initiates the formation of a female thread form in the base material 16. A washer 14 is captivated between the head 22 and the anchoring element 13. The washer 14 includes a recess 36 in its upper surface which receives the head 22. The inner diameter of the washer 14 is such that the threads 21 slide freely therethrough. The washer 14 engages the plate 15 to distribute holddown forces to the insulation 18. The plate 15 includes a ridge 51 which adjoins a frustoconical skirt 53 adapted to mate with the undersurface of the washer 14. The opening 50 in the plate 15 is substantially smaller in diameter than the outer diameter of the washer 14.

Figure 2:
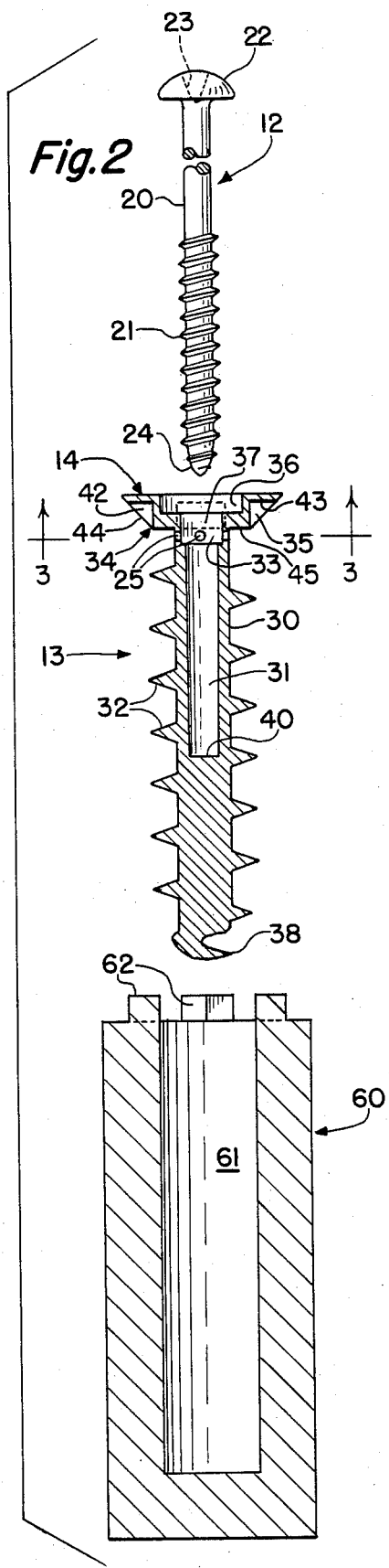
FIG. 2 is an exploded elevational view in partial section of the fastening assembly of the present invention and a device used to assemble the components thereof.

FIG. 2 shows how the assembly 10 is put together. A holder 60 having a cavity 61 is placed beneath the anchoring element 13. The anchoring element 13 is initially a unitary component comprised of the threaded body 30 and the washer 14 which is integrally molded with the body 30 as a flange. The washer 14 includes notches 35 formed in the undersurface thereof, and a neck 33 which frangibly connects the washer 14 to the body 30. The holder 60 is held against rotation and the anchoring element 13 is inserted into the cavity 61. The size of the cavity 61 is such that the thread 32 on the anchoring element 13 does not engage the holder. However, the wedges 62 on the upper surface of the holder 60 engage the notches 35 and therefore prevent rotation of the anchoring element 13. The screw 12 is inserted into the anchoring element 13 through the recesses 36 and 37 and into the bore 31. The crest diameter of the thread 21 on the screw 12 is generally less than the diameter of the recesses 36 and 37 and generally greater than the diameter of the bore 31. When the tip 24 of the screw engages the bottom 40 of the bore 31, or when sufficient engagement exists between the screw and the anchoring element, the neck 33 breaks off. The neck 33 is perforated by holes 25 which facilitate the separation of the flange 14 from the anchoring element 13. As a result, the washer 14 is captivated between the head 22 and the anchoring element 13. It should be noted that the outer diameter of the washer 14 is greater than the crest diameter of the thread 32. The bore 31 is slightly tapered to facilitate the removal of a core pin used to mold the anchoring element.

The anchoring element 13 is preferably made of a moldable material because the formation of the high thread by a rolling operation would be extremely difficult. The significant lateral dimension required in the thread is necessitated by the generally weak nature of the base material 16 for which the fastening assembly is designed. The included angle of the thread 32 at its crest is less than 45°, and it has been found that a thread having an included angle of between 35 and 40 degrees provides good thread forming properties and pull-out resistance in gypsum-based and light weight aggregate concrete roofing materials. The base materials referred to above may be a material called tectum which is comprised of paper fibers held together in a gypsum binder. Another example of the base material in which the present invention is particularly useful is light weight concrete in which cinders are used as aggregate making the material permeable and easily penetrable by a threaded fastener. It should be noted, however, that various materials are likely to be encountered. The thread 32 on the anchoring element 13 terminates in a sharp edge 38 which initiates the slicing action of the high crested thread 32, thus eliminating the need for a pre-drilled hole. The edge 38 is an extension of the thread 32 and is generally laterally oriented.

Figure 3:
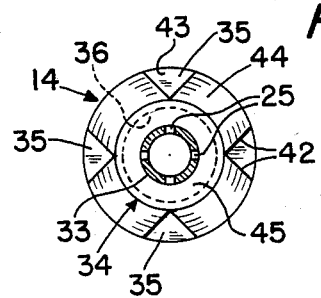
FIG. 3 is a sectional view of a portion of the fastening assembly shown in FIG. 2 taken along line 3—3 in FIG. 2.

FIG. 3 shows the undersurface of the washer 14 and the notches 35. The notches are formed by generally axially extending surfaces 42 and generally radially extending surfaces 43. The notches 35 are formed on the frusto-conical portion 44 of the undersurface. The thin frangible neck 33 and the bore 37 are shown in section. The undersurface of the washer 14 further includes generally radial surface 45.

While the anchoring element 13 can be made of any moldable material, it has been found that molding the element from a zinc material gives the anchoring element excellent strength and corrosion resistance.

The fastening assembly shown in FIG. 1 includes the plate 15. It should be noted that in some instances the plate 15 may not be necessary, particularly when a harder material is being fastened. The plate 15 is important when weak materials such as insulation are being installed in order to distribute the holddown load over a wide area. In other instances, the washer 14 can be molded in such a way as to create a larger lateral extent, thereby avoiding the need for a second washer element. It should also be noted that in some instances a second washer made of plastic may be desirable in which case the configuration of the interface between the frangible washer and the plate may be designed to avoid creep problems associated with plastic washers.

While the invention has been described in terms of a specific embodiment, it is clear that many modifications, variations and alternatives will be apparent to those skilled in the art. Accordingly, it is intended that such modifications, variations and alternatives be within the spirit and scope of the appended claims.

We claim:

1. An anchoring element comprising a generally cylindrical body having a thread thereon defining a crest diameter and a root diameter, said crest diameter being generally twice as large as said root diameter, and a bore in one end of said body adapted to receive a screw therein, said body including an integrally molded flange at one end thereof, said bore including three sections of differing diameters, a first of said three sections adapted to receive a screw head, a second section of lesser diameter than said first section, and a third section of lesser diameter than said second section.

2. A fastening element in accordance with claim 1 made of a molded zinc material.

3. A fastening element in accordance with claim 1 wherein said thread has an included angle of less than 45° at its crest.

* * * * *